US009028041B2

(12) United States Patent
Kondo

(10) Patent No.: US 9,028,041 B2
(45) Date of Patent: May 12, 2015

(54) ELECTRONIC DEVICE AND LIQUID EJECTION APPARATUS

(71) Applicant: Koichi Kondo, Nisshin (JP)

(72) Inventor: Koichi Kondo, Nisshin (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/039,550

(22) Filed: Sep. 27, 2013

(65) Prior Publication Data

US 2014/0092169 A1    Apr. 3, 2014

(30) Foreign Application Priority Data

Sep. 28, 2012  (JP) .................................. 2012-218321

(51) Int. Cl.
| | | |
|---|---|---|
| B41J 29/38 | (2006.01) |
| B41J 2/015 | (2006.01) |
| B41J 2/165 | (2006.01) |
| H02M 3/335 | (2006.01) |
| B41J 2/01 | (2006.01) |
| B41J 2/17 | (2006.01) |
| H02J 9/00 | (2006.01) |
| B41J 29/393 | (2006.01) |

(52) U.S. Cl.
CPC .............. *H02M 3/33561* (2013.01); *B41J 2/01* (2013.01); *B41J 2/1707* (2013.01); *H02J 9/005* (2013.01); *B41J 29/38* (2013.01); *B41J 2029/3932* (2013.01)

(58) Field of Classification Search
USPC ............................................. 347/14, 20, 23
See application file for complete search history.

(56) References Cited

U.S. PATENT DOCUMENTS

| | | | |
|---|---|---|---|
| 6,362,980 B1 | 3/2002 | Ohashi et al. | |
| 6,545,451 B2 * | 4/2003 | Jung .............................. | 323/283 |
| 2011/0150523 A1 * | 6/2011 | Kawakatsu ..................... | 399/88 |
| 2012/0153866 A1 * | 6/2012 | Liu ............................... | 315/294 |
| 2013/0002746 A1 * | 1/2013 | Takayanagi et al. ............ | 347/14 |

FOREIGN PATENT DOCUMENTS

| | | |
|---|---|---|
| JP | 10-254590 A | 9/1998 |
| JP | 2001-169549 A | 6/2001 |
| JP | 2008-233265 A | 10/2008 |

* cited by examiner

*Primary Examiner* — Jason Uhlenhake
(74) *Attorney, Agent, or Firm* — Scully, Scott, Murphy & Presser, P.C.

(57) ABSTRACT

An electronic device includes: a device body; a power supply circuitry which supplies electric power to the device body; and a real-time clock which measures a current time. The power supply circuitry includes: a transformer which converts electric power input to a primary side of the transformer and outputs the converted power to a secondary side of the transformer; a switching element disposed on the primary side to perform switching of a current to be supplied to the primary winding; and a switching controller disposed on the primary side. The real-time clock is disposed on the primary side to receive electric power. The device body includes: a main controller disposed on the secondary side to control the electronic device that receives electric power on the secondary side; and a circuit which couples the main controller and the real-time clock to allow communication therebetween in an electrically insulated state.

14 Claims, 5 Drawing Sheets

ELECTRONIC DEVICE AND LIQUID EJECTION APPARATUS

CROSS REFERENCE TO RELATED APPLICATION

The present application claims priority from Japanese Patent Application No. 2012-218321, which was filed on Sep. 28, 2012, the disclosure of which is herein incorporated by reference in its entirety.

BACKGROUND OF THE INVENTION

1. Field of the Invention

The present invention relates to an electronic device and a liquid ejection apparatus.

2. Description of the Related Art

There is conventionally known an electronic device including a device body (i.e., a device main body) and a power supply circuitry for supplying electric power to the device body. For example, there is known a computer system as one example of the electronic device. A power supply circuitry of this computer system includes: a transformer including a primary winding and a secondary winding; and a transistor switch coupled to the primary winding of the transformer. Switching of the transistor switch is controlled to execute on/off control for power supply to the primary winding of the transformer. Electric power excited by the secondary winding of the transformer is supplied to a computer body, i.e., a device body. The computer body contains, e.g., a real-time clock and a CPU for executing various programs. That is, the CPU and the real-time clock of this computer system are disposed on a secondary side of the transformer.

SUMMARY OF THE INVENTION

Incidentally, even when power supply to, e.g., a CPU of an electronic device is stopped to switch the electronic device to a nonoperating state, electric power needs to be supplied to a real-time clock in order to measure a current time. In the computer system as described above, even when a nonoperating state is established, electric power needs to be transmitted from a primary side to the secondary side of the transformer in order to supply the electric power to the real-time clock. Here, the power transmission from the primary side to the secondary side of the transformer suffers various power losses such as a switching loss of the transistor switch and a loss in the transformer. Accordingly, in the computer system as described above, large power losses are caused even in the nonoperating state.

This invention has been developed to provide an electronic device and a liquid ejection apparatus including a main control circuit for controlling operations of the electronic device or the liquid ejection apparatus and capable of reducing power losses when power supply to the main control circuit is stopped and at the same time power is supplied to a real-time clock.

The present invention provides An electronic device including: a device body; a power supply circuitry configured to supply electric power to the device body; and a real-time clock configured to measure a current time, the power supply circuitry including: a transformer including a primary winding and a secondary winding, the transformer being configured to convert electric power input to a primary side of the transformer and configured to output the converted electric power to a secondary side of the transformer; a switching element disposed on the primary side of the transformer and configured to perform switching of a current to be supplied to the primary winding; and a switching controller disposed on the primary side of the transformer and configured to control a start and a stop of the switching of the switching element based on an input signal input from outside the power supply circuitry, the real-time clock being disposed on the primary side of the transformer and configured to receive electric power on the primary side of the transformer, the device body including: a main controller disposed on the secondary side of the transformer and configured to control an operation of the electronic device that receives electric power on the secondary side of the transformer; and a first communicably coupling circuit configured to couple the main controller and the real-time clock to each other so as to allow communication therebetween in an electrically insulated state.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

Hereinafter, there will be described an electronic device in the form of an ink-jet printer (as one example of a liquid ejection apparatus) according to one embodiment of the present invention by reference to the drawings.

Figure 1:
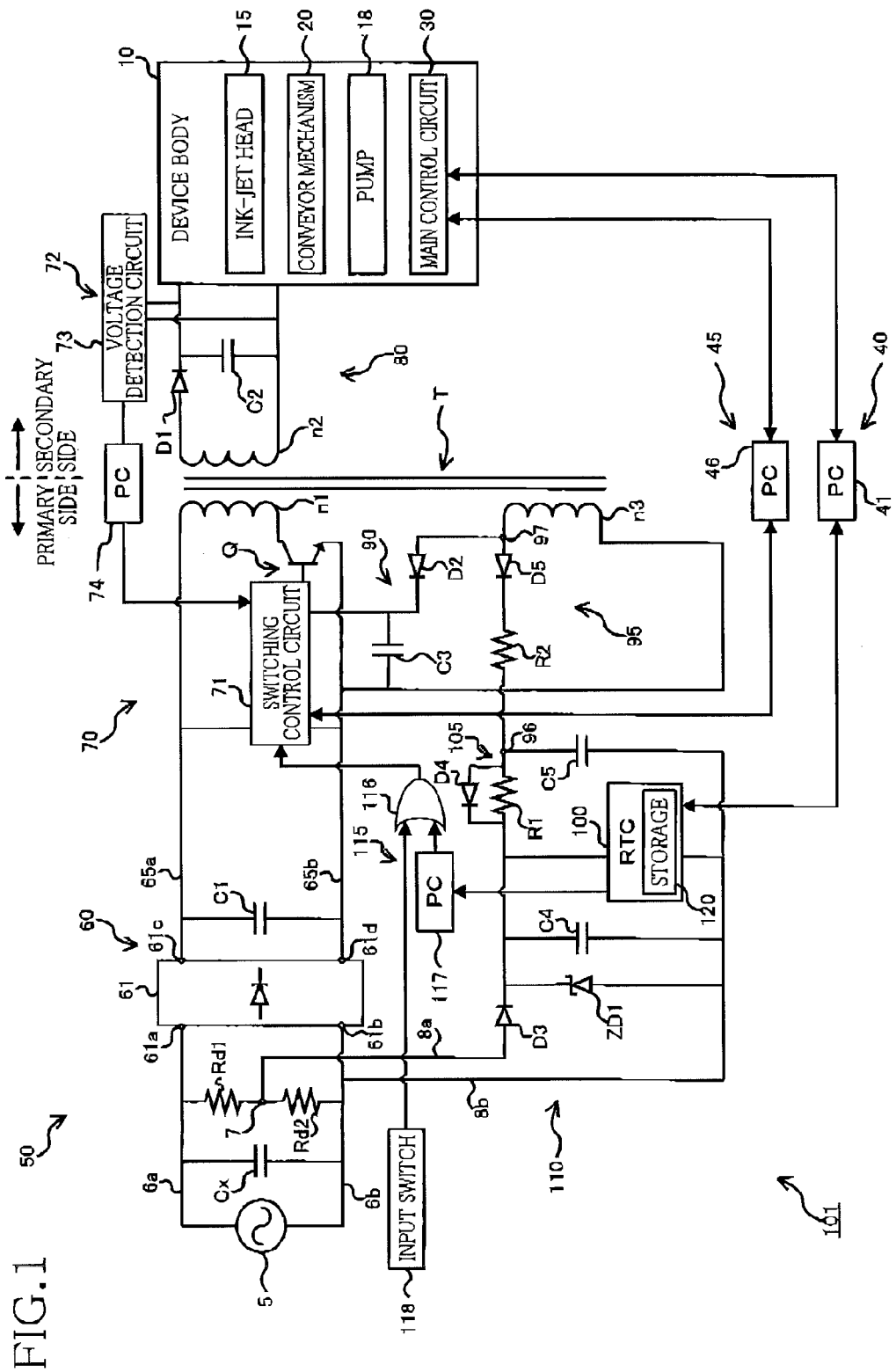
FIG. 1 is a circuit diagram of an ink-jet printer according to one embodiment of the present invention.

An ink-jet printer 101 is configured to record an image on a recording medium in the form of a sheet P. As illustrated in FIG. 1, the printer 101 includes: a device body (a device main body) 10; a power supply circuitry 50 for supplying electric power to the device body 10; and a real-time clock (RTC) 100 for measuring a current time.

The power supply circuitry 50 includes a primary rectifying and smoothing circuit 60, a power converter circuit 70, a secondary rectifying and smoothing circuit 80, and a tertiary rectifying and smoothing circuit 90.

The primary rectifying and smoothing circuit 60 is designed to convert alternating-current power (AC power) supplied from an alternating-current power supply 5, to primary direct-current power (DC power) by rectifying and smoothing the AC power. The primary rectifying and smoothing circuit 60 includes a bridge rectifier circuit 61 (as one example of a first rectifier circuit) and a smoothing capacitor C1. The bridge rectifier circuit 61 is a full-wave rectifier circuit (e.g., a diode bridge circuit) configured to rectify the AC power supplied from the alternating-current power supply 5, to the DC power. Input terminals 61a, 61b of the bridge rectifier circuit 61 are connected to power supply lines 6a, 6b of the alternating-current power supply 5, respectively. Between the power supply lines 6a, 6b, an across-the-line capacitor Cx for removing high-frequency noise and a series circuit consisting of two discharge resistors Rd1, Rd2 are connected in parallel. Each of the discharge resistors Rd1, Rd2 is a resistor for discharging electric charge accumulated in the across-the-line capacitor Cx.

The smoothing capacitor C1 is designed to smooth pulsating DC power that is output from the bridge rectifier circuit 61. This smoothing capacitor C1 is connected between a voltage line 65a and a common line 65b which are connected to output terminals 61c, 61d of the bridge rectifier circuit 61, respectively.

The power converter circuit 70 is designed to convert the primary DC power obtained by the primary rectifying and smoothing circuit 60, to desired secondary AC power and output this secondary AC power to the secondary rectifying and smoothing circuit 80. The power converter circuit 70 includes a transformer T, a switching element Q, a switching control circuit 71, and a feedback circuit 72. The switching control circuit 71 and a series circuit consisting of the switching element Q and a primary winding n1 (which will be described below) of the transformer T are connected in parallel between the voltage line 65a and the common line 65b.

The transformer T is designed to convert electric power supplied to a primary side thereof and output the converted electric power to a secondary side thereof. This transformer T includes the primary winding n1, a secondary winding n2, and a tertiary winding n3. The primary winding n1 is for producing a voltage using a switching current to produce excitation energy in the transformer T. Each of the secondary winding n2 and the tertiary winding n3 is for producing a voltage using the excitation energy produced by the primary winding n1. It is noted that the primary winding n1 and the tertiary winding n3 are electrically insulated and separated from the secondary winding n2, and circuits connected to the primary winding n1 and the tertiary winding n3 are located on the primary side, while a circuit connected to the secondary winding n2 is located on the secondary side.

The switching element Q is a transistor for switching the current flowing in the primary winding n1 of the transformer T, to induce a voltage in the primary winding n1 of the transformer T.

The switching control circuit 71 is designed to supply a pulsating drive signal to the switching element Q to control switching for turning on or off the switching element Q. Specifically, the feedback circuit 72 sends the switching control circuit 71 output voltage data (which will be described below) representing an output voltage of the secondary rectifying and smoothing circuit 80, and the switching control circuit 71 uses a pulse width modulation (PWM) to execute a constant-voltage control based on the received output voltage data such that the output voltage represented by the output voltage data becomes equal to a predetermined voltage. More specifically, in a case where the output voltage represented by the output voltage data is higher than the predetermined voltage, the switching control circuit 71 reduces an on-duty ratio of a drive pulse to be output to the switching element Q, and in a case where the output voltage is lower than the predetermined voltage, the switching control circuit 71 increases the on-duty ratio.

Also, the switching control circuit 71 is designed to start and stop outputting the drive signal to the switching element Q based on an input signal supplied from outside the switching control circuit 71, to control a start and a stop of the switching of the switching element Q. Specifically, when a start request signal (which will be described below) is supplied to the switching control circuit 71 from outside the switching control circuit 71, the switching control circuit 71 starts outputting the drive signal to the switching element Q to start the switching of the switching element Q, so that electric power is transmitted from the primary side to the secondary side of the transformer T. In contrast, when a first stop request signal or a second stop request signal (which will be described below) is input to the switching control circuit 71 from outside the switching control circuit 71. The switching control circuit 71 stops outputting the drive signal to the switching element Q to stop the switching of the switching element Q. This stops the transmission of the electric power from the primary side to the secondary side of the transformer T.

The feedback circuit 72 includes a voltage detection circuit 73 designed to sense or detect the output voltage of the secondary rectifying and smoothing circuit 80 to send the switching control circuit 71 the output voltage data representative of the output voltage. Here, since the switching control circuit 71 and the secondary rectifying and smoothing circuit 80 are respectively disposed on the primary side and the secondary side, the secondary rectifying and smoothing circuit 80 and the switching control circuit 71 are electrically insulated and separated from each other. Thus, the feedback circuit 72 is provided with a photocoupler or optoisolator 74 between the voltage detection circuit 73 and the switching control circuit 71. This photocoupler 74 can transmit signals in an electrically insulated state. The voltage detection circuit 73 and the switching control circuit 71 are coupled to each other such that communication therebetween is allowed by the photocoupler 74 in the electrically insulated state.

The secondary rectifying and smoothing circuit 80 is designed to convert the secondary AC power that is output according to the voltage produced in the secondary winding n2 of the transformer T, to a secondary DC power to supply or output the obtained secondary DC power to the device body 10. The secondary rectifying and smoothing circuit 80 includes a diode D1 and a smoothing capacitor C2. The diode D1 is designed to rectify the secondary AC power to a DC power. The smoothing capacitor C2 is designed to smooth a current that passed through the diode D1, to produce the secondary DC power. When the secondary DC power produced by the smoothing capacitor C2 is supplied to the device body 10, the device body 10 is switched from a nonoperating state to an operating state.

The tertiary rectifying and smoothing circuit 90 is designed to convert the AC power that is output according to the voltage produced hi the tertiary winding n3 of the transformer T, to a DC power to supply the obtained DC power to the switching control circuit 71. The tertiary rectifying and smoothing circuit 90 includes a diode D2 and a smoothing capacitor C3. The diode D2 is designed to rectify the AC power to a DC power. The smoothing capacitor C3 is designed to smooth a direct current that passed through the diode D2. The DC power smoothed by the smoothing capacitor C3 is supplied to the switching control circuit 71. In the present embodiment, when the device body 10 is in the nonoperating state (that is, when the secondary DC power is not being supplied to the device body 10), the switching control circuit 71 receives the electric power supplied from the voltage line 65a and the common line 65b, and when the device body 10 is in the operating state, the switching control circuit 71 receives the electric power supplied from the tertiary rectifying and smoothing circuit 90.

Figure 2:
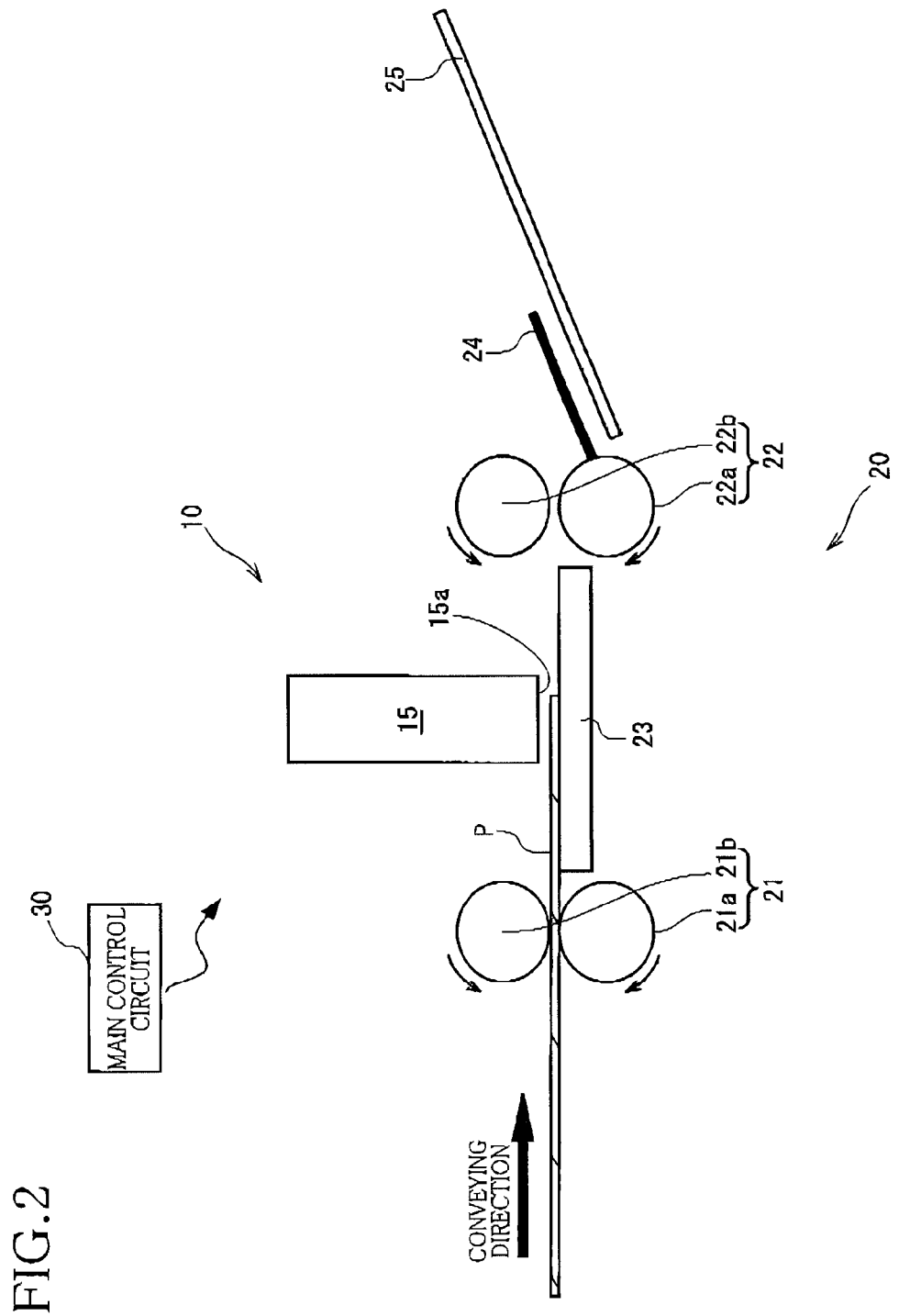
FIG. 2 is a view schematically illustrating a structure of a device body of the ink-jet printer illustrated in FIG. 1.

There will be next explained the device body 10 in detail with reference to FIG. 2. As illustrated in FIG. 2, the device body 10 includes: a conveyor mechanism 20 configured to convey a recording medium in the form of the sheet P; a liquid ejection head in the form of an ink-jet head 15 (hereinafter may be referred to as "head 15") configured to eject ink onto the sheet P being conveyed by the conveyor mechanism 20; an ink tank, not shown, storing the ink to be supplied to the head 15; a main control circuit 30 (see FIG. 1) for controlling operations of the printer 101; a first communicably coupling circuit 40 (see FIG. 1); and a second communicably coupling circuit 45 (see FIG. 1).

The conveyor mechanism 20 is configured to convey the sheet P in a conveying direction directed from the left side to the right side in FIG. 2. The conveyor mechanism 20 includes a first conveyor unit 21, a second conveyor unit 22, a platen 23, a peeling plate 24, and a sheet-output tray 25.

The first conveyor unit 21 includes a pair of conveyor rollers 21a, 21b; and a drive motor, not shown, for rotating the conveyor rollers 21a, 21b. The pair of conveyor rollers 21a, 21b are rotated by the drive motor respectively in different directions (see arrows in FIG. 2) to convey the sheet P in the conveying direction while nipping the sheet P supplied from a sheet-supply mechanism, not shown.

The second conveyor unit 22 includes: a pair of conveyor rollers 22a, 22b; and a drive motor for rotating the conveyor rollers 22a, 22b. The conveyor rollers 22a, 22b are rotated by the drive motor respectively in different directions (see arrows in FIG. 2) to convey the sheet P in the conveying direction while nipping the sheet P being conveyed by the first conveyor unit 21.

The head 15 is a line head extending in a direction perpendicular to a sheet surface of FIG. 2 and disposed between the first conveyor unit 21 and the second conveyor unit 22 in the conveying direction. The head 15 is coupled to the ink tank via a tube, not shown, and a pump 18. The pump 18 is driven when the ink is forced to be transferred to the head 15 (i.e., upon a purging operation and an initial introduction of the liquid). The pump 18 is stopped in the other situations so as not to avoid the ink supply to the head 15.

A lower face of the head 15 serves as an ejection face 15a having a multiplicity of ejection openings, not shown, through which the ink is ejected. When the sheet P being conveyed by the conveyor mechanism 20 passes through a position just under the head 15, actuators are driven, causing the head 15 to eject ink droplets from the ejection openings. As a result, a desired image is recorded on the sheet P.

The platen 23 is disposed between the first conveyor unit 21 and the second conveyor unit 22 in the conveying direction so as to face the ejection face 15a of the head 15. The platen 23 supports a lower side of the sheet P being conveyed by the first conveyor unit 21 and the second conveyor unit 22. During this support, a space appropriate for image recording is defined between an upper face of the platen 23 and the ejection face 15a of the head 15.

The peeling plate 24 is disposed downstream of the second conveyor unit 22 in the conveying direction to peel the sheet P from outer circumferential surfaces of the conveyor rollers 22a, 22b. The sheet P peeled by the peeling plate 24 is discharged onto the sheet-output tray 25.

The main control circuit 30 is designed to control overall operations of the printer 101. As illustrated in FIG. 1, the main control circuit 30 is disposed on the secondary side of the transformer T and receives electric power on the secondary side of the transformer T. This main control circuit 30 will be explained later in detail.

Returning to FIG. 1, the first communicably coupling circuit 40 is designed to communicably couple the main control circuit 30 and a real-time clock 100 to each other. Here, since the real-time clock 100 is disposed on the primary side as will be described below, the real-time clock 100 and the main control circuit 30 are electrically insulated and separated from each other. Thus, the first communicably coupling circuit 40 includes a photocoupler 41 in the present embodiment, whereby the real-time clock 100 and the main control circuit 30 are coupled to each other such that communication therebetween is allowed by the photocoupler 41 in an electrically insulated state.

The second communicably coupling circuit 45 is designed to couple the main control circuit 30 and the switching control circuit 71 to each other so as to allow communication therebetween in an electrically insulated state. The second communicably coupling circuit 45 includes a photocoupler 46 like the first communicably coupling circuit 40.

There will be next explained the real-time clock 100. The real-time clock 100 is designed to measure a current time based on its own clock and perform various data communications with the main control circuit 30 of the device body 10 via the first communicably coupling circuit 40. For example, the real-time clock 100 transmits data representative of the current time to the main control circuit 30 in response to a request transmitted from the main control circuit 30. Also, as illustrated in FIG. 1, the real-time clock 100 is disposed on the primary side of the transformer T and receives electric power on the primary side of the transformer T. Specifically, input terminals of the real-time clock 100 are connected, via a rectifying and smoothing circuit 110, to a connection point 7 of the adjacent discharge resistors Rd1, Rd2 and power lines 8a, 8b connected to the power supply line 6b. Here, resistance values of the discharge resistors Rd1, Rd2 are determined by, e.g., the alternating voltage of the alternating-current power supply 5, electric power supplied to the real-time clock 100 (power consumption of the real-time clock 100), and a capacitance of the across-the-line capacitor Cx.

The rectifying and smoothing circuit 110 is designed to convert, to DC power, AC power produced and output according to a voltage produced between the connection point 7 and the power supply line 6b (i.e., a voltage obtained by dividing a voltage between the power supply lines 6a, 6b in the discharge resistors Rd1, Rd2). The rectifying and smoothing circuit 110 includes a diode D3, a smoothing capacitor C4, and a Zener diode ZD1. The diode D3 is designed to rectify AC power to DC power. The smoothing capacitor C4 is designed to smooth the direct current that passed through the diode D3. The Zener diode ZD1 is connected to opposite ends of the smoothing capacitor C4 to keep a value of the voltage supplied to the real-time clock 100 at a fixed value.

In the present embodiment as described above, the real-time clock 100 receives electric power from the connection point 7 of the adjacent discharge resistors Rd1, Rd2 and the power lines 8a, 8b connected to the power supply line 6b, resulting in effective use of a current that flows in the discharge resistors when the AC power is being supplied from the alternating-current power supply 5.

Here, consider a case where the real-time clock is disposed on the secondary side of the transformer and receives the electric power on the secondary side unlike the present embodiment. In this case, even when the device body is switched to the nonoperating state, the electric power needs to be transmitted from the primary side to the secondary side of the transformer to supply the electric power to the real-time clock. Here, the transmission of the electric power from the primary side to the secondary side of the transformer suffers various power losses such as a switching loss of the switching element and a loss in the transformer. Thus, large power losses are caused even when the device body is switched to the nonoperating state.

In the present embodiment, in contrast, the real-time clock 100 is disposed on the primary side of the transformer T, eliminating the need to transmit the electric power from the primary side to the secondary side of the transformer T when the device body 10 is switched to the nonoperating state. As a result, power losses can be reduced.

Also, the real-time clock 100 includes a storage 120 as one example of a starting time storage. The storage 120 is configured to store starting time information and stopping time information transmitted from the main control circuit 30 to the real-time clock 100 via the first communicably coupling circuit 40. When the current time has reached the starting time represented by the starting time information stored in the storage 120, the real-time clock 100 transmits the start request signal to the switching control circuit 71 via a third communicably coupling circuit 115. The start request signal is a signal which requests a start of the switching of the switching element Q. On the other hand, when the current time has reached the stopping time represented by the stopping time information stored in the storage 120, the real-time clock 100 transmits the second stop request signal to the switching control circuit 71 via the third communicably coupling circuit 115. The second stop request signal is a signal which requests a stop of the switching of the switching element Q.

Here, since the switching control circuit 71 is disposed on an output side of the bridge rectifier circuit 61, a ground level of the switching control circuit 71 differs from that of the real-time clock 100. Thus, in the present embodiment, the third communicably coupling circuit 115 includes a photocoupler 117, whereby the real-time clock 100 and the switching control circuit 71 are coupled to each other such that communication therebetween is allowed by the photocoupler 117 in an electrically insulated state. This configuration can prevent a large voltage to be applied from the real-time clock 100 to the switching control circuit 71.

The third communicably coupling circuit 115 further includes an OR circuit 116. This OR circuit 116 is a logic circuit designed to execute a logical OR-ing of a signal output from the photocoupler 117 and a signal output from an input switch 118. The input switch 118, when operated by a user, activates the device body 10 of the printer 101 or switches the device body 10 to the operating state. Specifically, the input switch 118 transmits the start request signal to the switching control circuit 71 in response to user input.

As illustrated in FIG. 1, a backup power supply circuit 105 is connected between the input terminals of the real-time clock 100 to supply electric power to the real-time clock 100 when the power supply from the alternating-current power supply 5 is stopped in the event of, e.g., a power failure. The backup power supply circuit 105 is a circuit in which a capacitor C5 and a parallel circuit consisting of a diode D4 and a resistor R1 are connected to each other in series. An anode of the diode D4 is connected to the capacitor C5, and a cathode thereof is connected to the real-time clock 100.

In the structure as described above, when the backup power supply circuit 105 is receiving the electric power supplied from the alternating-current power supply 5, a direct current passes through the resistor R1 according to a voltage applied between the input terminals of the real-time clock 100, so that electric charge is accumulated in the capacitor C5. When the power supply from the alternating-current power supply 5 is stopped, on the other hand, the electric charge accumulated in the capacitor C5 passes through the diode D4 to supply the electric power to the real-time clock 100.

Here, in the operating state of the device body 10, the real-time clock 100 requires higher power consumption for communicating with the main control circuit 30, than in the nonoperating state of the device body 10. Therefore, in a case where electric power is supplied to the real-time clock 100 only from the power lines 8a, 8b in the operating state of the device body 10, there is a possibility of an insufficient power supply to the real-time clock 100. Furthermore, in a case where electric power is supplied to the backup power supply circuit 105 only from the power lines 8a, 8b, there is a possibility that sufficient electric charge is not accumulated in the capacitor C5, and when the power supply from the alternating-current power supply 5 is stopped, enough electric power cannot be supplied to the real-time clock 100.

In order to solve this problem, as illustrated in FIG. 1, the power supply circuitry 50 in the present embodiment further includes a rectifier circuit 95 as one example of a second rectifier circuit that allows the electric power output from the tertiary winding n3 of the transformer T to be supplied to the real-time clock 100 and the capacitor C5.

The rectifier circuit 95 is a series circuit consisting of a diode D5 and a resistor R2 and designed to convert, to a DC power, the AC power output according to the voltage produced in the tertiary winding n3 of the transformer T. One end of the rectifier circuit 95 is connected to a connection point 96 of the capacitor C5 and the parallel circuit consisting of the diode D4 and the resistor R1, and the other end of the rectifier circuit 95 is connected to a connection point 97 of the tertiary winding n3 and the diode D2. The AC power output from the tertiary winding n3 of the transformer T is rectified by the diode D5, then passes through the resistor R2, and then is supplied to the real-time clock 100 and the capacitor C5. As a result, when the device body 10 is in the operating state, enough electric power can be supplied to the real-time clock 100 and the capacitor C5.

There will be briefly explained operations of the power supply circuitry 50. In the following description, there will be explained, by way of example, operations in a case where the AC power starts to be input from the alternating-current power supply 5 to the power supply circuitry 50.

When the AC power is input from the alternating-current power supply 5 to the power supply circuitry 50, the AC power is converted to the primary DC power by the primary rectifying and smoothing circuit 60. The converted primary DC power is supplied to the power converter circuit 70 and the switching control circuit 71. At the same time, a part of the alternating current flowing through the discharge resistors Rd1, Rd2 passes through the power lines 8a, 8b, then is rectified and smoothed by the rectifying and smoothing circuit 110, and supplied to the real-time clock 100 and the capacitor C5.

When the switching control circuit 71 has received the start request signal from the input switch 118 via the third communicably coupling circuit 115, the switching control circuit 71 starts outputting the drive signal to the switching element Q to start the switching of the switching element Q. As a result, the secondary AC power is induced in the secondary winding n2 of the transformer T. This secondary AC power is converted by the secondary rectifying and smoothing circuit 80 to the secondary DC power that is then supplied to the device body 10. As a result, the device body 10 is switched from the nonoperating state to the operating state. Also, based on the output voltage of the secondary rectifying and smoothing circuit 80, the switching control circuit 71 increases or reduces a duty ratio of a pulse for executing on/off control for the switching element Q, to change an on-time of the switching element Q, thereby controlling the output voltage.

Also, the current flowing in the primary winding n1 is switched to output the AC power in the tertiary winding n3. A part of the AC power output from the tertiary winding n3 is rectified and smoothed by the tertiary rectifying and smoothing circuit 90 and supplied to the switching control circuit 71. Also, a part of the AC power output from the tertiary winding n3 is rectified by the rectifier circuit 95 and supplied to the real-time clock 100 and the capacitor C5. As a result, even if the power consumption of the real-time clock 100 increases in the operating state of the device body 10, the electric power is supplied from the tertiary winding n3, preventing insufficient electric power in the real-time clock 100. Furthermore, enough electric charge can be accumulated in the capacitor C5 for the backup power supply.

Figure 3:
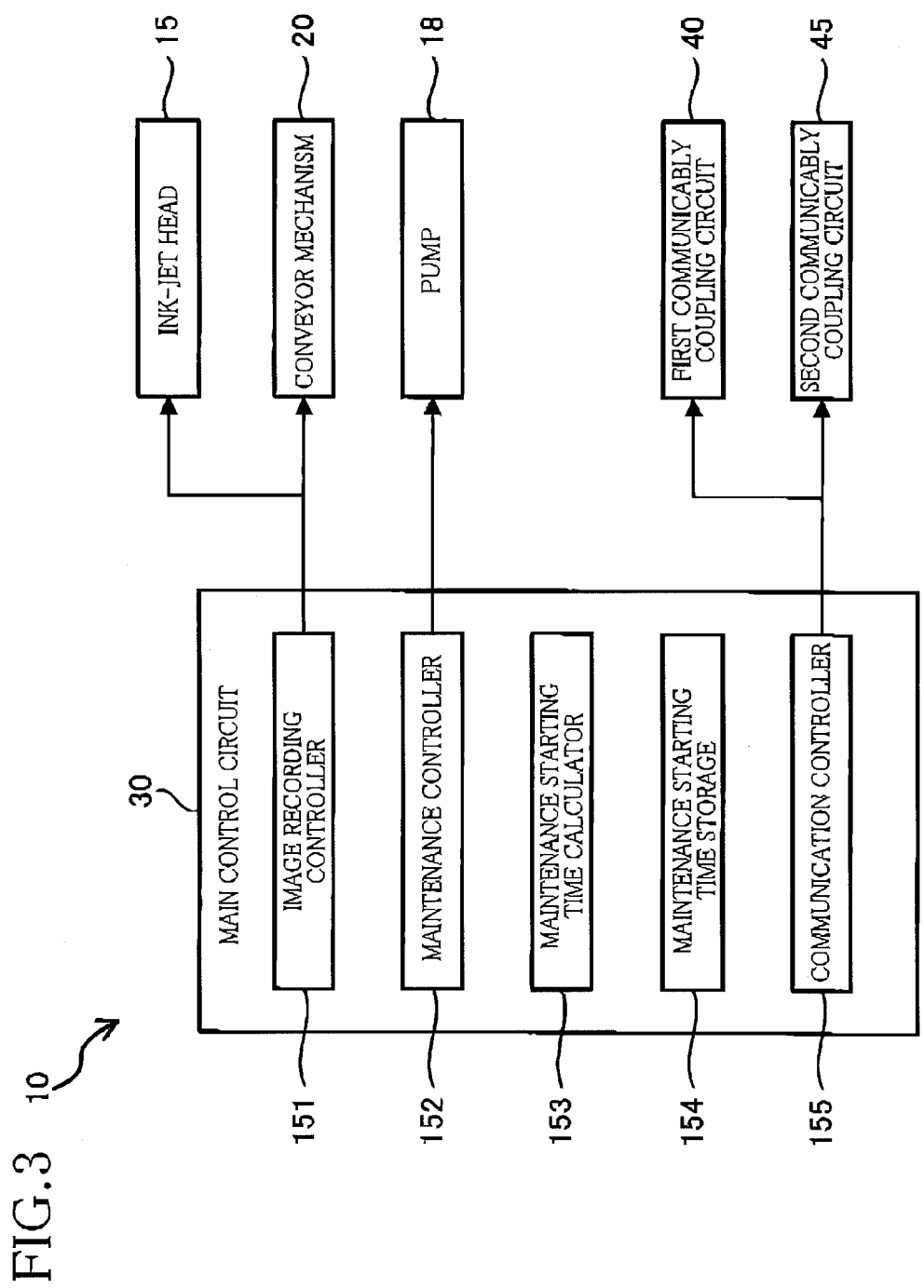
FIG. 3 is a functional block diagram of a main control circuit illustrated in FIG. 1.

There will be next explained the main control circuit 30 in detail with reference to FIG. 3. The main control circuit 30 includes: a central processing unit (CPU); a read only memory (ROM) for storing programs executable by the CPU and data for these programs; and a random access memory (RAM) for temporarily storing data upon execution of the program. The main control circuit 30 includes various functional sections that are constituted by the above-described hardware and software in the ROM. As illustrated in FIG. 3, these functional sections include an image recording controller 151, a maintenance controller 152, a maintenance starting time calculator 153, a maintenance starting time storage 154, and a communication controller 155.

The image recording controller 151 is configured to execute an image recording processing for recording an image on a sheet P based on a recording command received from an external device such as a personal computer. Specifically, the image recording controller 151 controls the conveyor mechanism 20 to convey the sheet P in the conveying direction at a predetermined speed. The image recording controller 151 also controls the head 15 (specifically, the actuators thereof) based on image data contained in the recording command to eject the ink from the ejection openings onto the sheet P conveyed to an area opposite the ejection face 15a.

Incidentally, in a case where the ink has not been ejected from the ejection openings of the head 15 for a relatively long time, the viscosity of the ink in the ejection openings increases, causing clogging and deterioration of ink ejection performance. To solve this problem, in the present embodiment, when a non-ejection period over which the ink is not ejected from the ejection openings of the head 15 becomes equal to or longer than a predetermined length of time (hereinafter referred to as "maintenance required period of time"), the maintenance controller 152 commands a maintenance operation for performing maintenance of the head 15. As the maintenance operation, the maintenance controller 152 in the present embodiment controls the pump 18 to perform the purging operation for forcibly discharging the ink from the ejection openings of the head 15. As a result, the high-viscosity ink can be discharged from the ejection openings, thereby preventing the clogging and recovering the ink ejection performance of the head 15. In the present embodiment, the pump 18 is one example of a maintenance mechanism.

The maintenance starting time calculator 153 is configured to calculate and determine a time (hereinafter may be referred to as "maintenance starting time") at which the non-ejection period reaches the maintenance required period of time. Specifically, the maintenance starting time calculator 153 determines, as a starting point in time, a time of completion of the preceding ink ejection from the ejection openings (noted that the ink ejection includes the ink ejection for the image recording operation and the ink ejection for the purging operation) and determines, as the maintenance starting time, a time obtained by adding the maintenance required period of time to the starting point in time.

The maintenance starting time storage 154 is configured to store the maintenance starting time calculated and determined by the maintenance starting time calculator 153. The maintenance controller 152 commands the maintenance operation when the current time has reached the maintenance starting time stored in the maintenance starting time storage 154.

The communication controller 155 is configured to transmit the first stop request signal to the switching control circuit 71 via the second communicably coupling circuit 45 after the image recording operation is finished by the image recording controller 151. The first stop request signal is for requesting the stop of the switching of the switching element Q to switch the device body 10 from the operating state to the nonoperating state. As a result of the transmission of the first stop request signal, the transmission of the electric power from the primary side to the secondary side of the transformer T is stopped, so that the device body 10 is switched to the nonoperating state. As a modification, the communication controller 155 may transmit the stopping time information representing the time at which the switching of the switching element Q is stopped, to the real-time clock 100 via the first communicably coupling circuit 40. In this case, when the current time has reached the time represented by the stopping time information, the real-time clock 100 transmits the second stop request signal to the switching control circuit 71.

Also, the communication controller 155 is configured to transmit the starting time information representing, as the start time, the maintenance starting time stored in the maintenance starting time storage 154, to the real-time clock 100 via the first communicably coupling circuit 40 just before the communication controller 155 transmits the first stop request signal to the switching control circuit 71 or before the current time reaches the time represented by the stopping time information. As a result, even if the device body 10 has been switched to the nonoperating state, the power supply to the device body 10 is started again when the non-ejection period becomes equal to the maintenance required period of time, allowing the maintenance controller 152 to perform the maintenance of the head 15. This makes it possible to prevent the clogging of the ejection openings and recover the ink ejection performance of the head 15.

Figure 4:
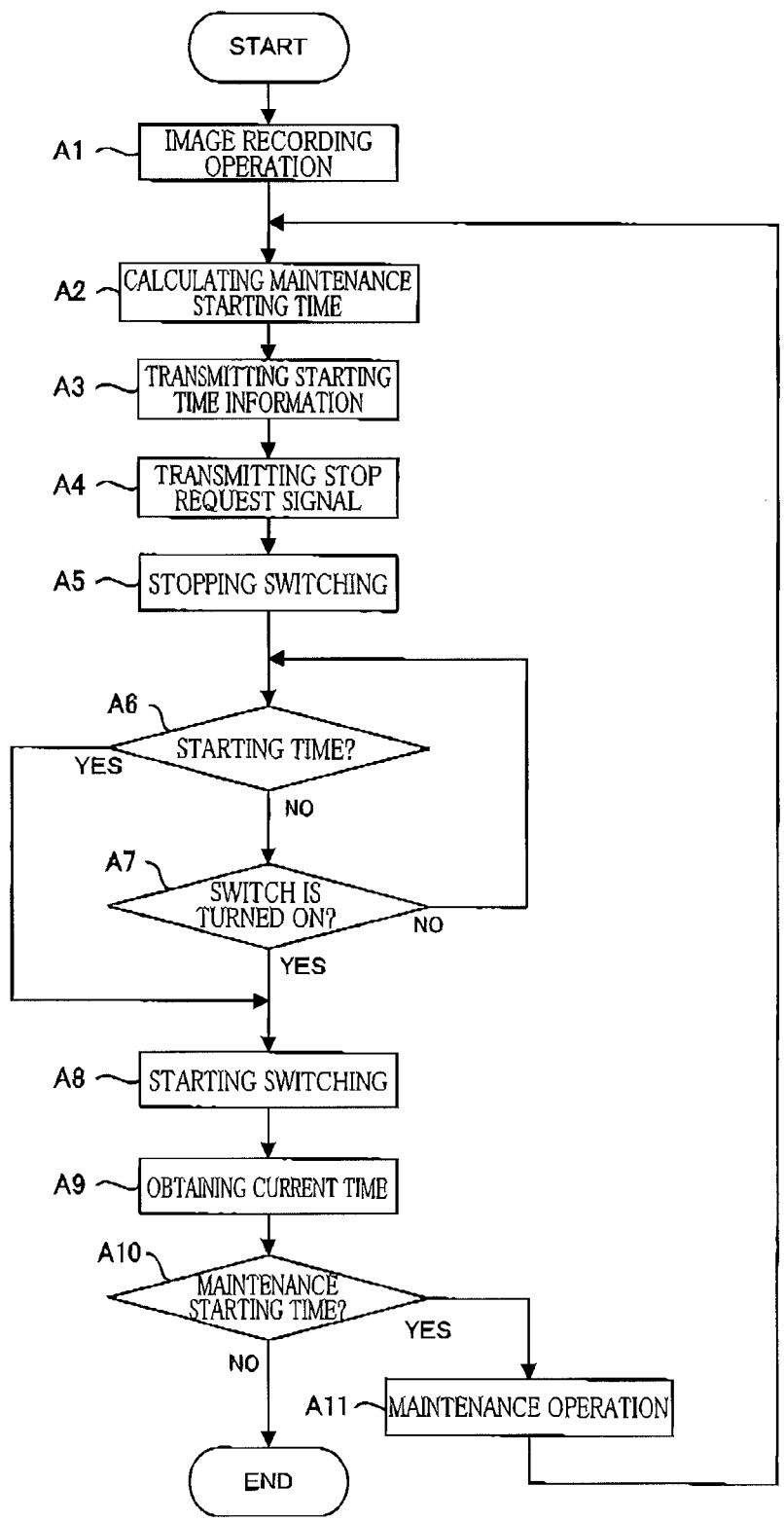
FIG. 4 is a flow illustrating operations of the ink-jet printer.

There will be next explained, with reference to FIG. 4, one example of operations of the printer 101 after completion of the image recording operation. When the image recording operation controlled by the image recording controller 151 is completed at A1, the maintenance starting time calculator 153 at A2 calculates and determines the maintenance starting time and stores it into the maintenance starting time storage 154. The communication controller 155 at A3 transmits the starting time information representing, as the start time, the maintenance starting time stored in the maintenance starting time storage 154, to the real-time clock 100 via the first communicably coupling circuit 40. The transmitted starting time information is stored into the storage 120 of the real-time clock 100. The communication controller 155 at A4 transmits the first stop request signal to the switching control circuit 71 via the second communicably coupling circuit 45.

Upon receipt of the first stop request signal from the main control circuit 30, the switching control circuit 71 at A5 stops outputting the drive signal to the switching element Q to stop the switching of the switching element Q. As a result, the power supply to the device body 10 is stopped to switch the device body 10 to the nonoperating state.

Then, steps A6 and A7 are repeated until the switching control circuit 71 receives the start request signal that is transmitted by the real-time clock 100 when the current time has reached the starting time represented by the starting time information stored in the storage 120 (A6: YES) or until the switching control circuit 71 receives the start request signal from the input switch 118 (A7: YES). When the switching control circuit 71 has received the start request signal from the real-time clock 100 or the input switch 118, the switching control circuit 71 at A8 starts outputting the drive signal to the switching element Q to start the switching of the switching element Q. As a result, the power supply to the device body 10 is started again, so that the device body 10 is switched to the operating state.

The communication controller 155 at A9 obtains the current time from the real-time clock 100 via the first communicably coupling circuit 40 and at A10 determines whether the obtained current time is the maintenance starting time stored in the maintenance starting time storage 154 or not. When the communication controller 155 determines that the current time is not the maintenance starting time (A10: NO), the communication controller 155 determines that the non-ejection period is shorter than the maintenance required period of time (that is, the device body 10 is switched to the operating state in response to user input for the input switch 118), and this flow ends. On the other hand, when the communication controller 155 determines that the current time is the maintenance starting time (A10: YES), the maintenance controller 152 at A11 controls the pump 18 to perform the purging operation as the maintenance operation by causing the head 15 to forcibly discharge the ink from the ejection openings. Upon completion of the processing at A11, this flow returns to A2.

In the present embodiment as described above, the real-time clock 100 is disposed on the primary side of the transformer T, eliminating the need to transmit the electric power from the primary side to the secondary side of the transformer T when the power supply to the main control circuit 30 is stopped. As a result, the power losses can be reduced.

In the present embodiment, even in the case where the electric power is transmitted from the primary side to the secondary side of the transformer T, when the non-ejection period becomes equal to the maintenance required period of time, the electric power starts to be transmitted from the primary side to the secondary side of the transformer T. Thus, the maintenance of the head 15 can be performed to prevent the clogging in the ejection openings and the deterioration of the ink ejection performance of the head 15.

While the embodiment of the present invention has been described above, it is to be understood that the invention is not limited to the details of the illustrated embodiment, but may be embodied with various changes and modifications, which may occur to those skilled in the art, without departing from the spirit and scope of the invention. For example, the real-time clock 100 is connected to the connection point: 7 of the adjacent discharge resistors Rd1, Rd2 and to the power lines 8a, 8b connected to the power supply line 6b in the above-described embodiment, but the real-time clock 100 may be disposed at any position as long as the real-time clock 100 is disposed on the primary side of the transformer T so as to receive the electric power on the primary side of the transformer T. For example, the real-time clock 100 may be connected between the power supply lines 6a, 6b or between the voltage line 65a and the common line 65b. In this case, the photocoupler 117 of the third communicably coupling circuit 115 is unnecessary.

While the two discharge resistors are provided in the above-described embodiment, three or more discharge resistors may be provided. In this case, the power lines 8a, 8b only need to be respectively connected to a connection point of adjacent discharge resistors and to a connection point of another pair of adjacent discharge resistors or one of the power supply lines 6a, 6b.

Figure 5:
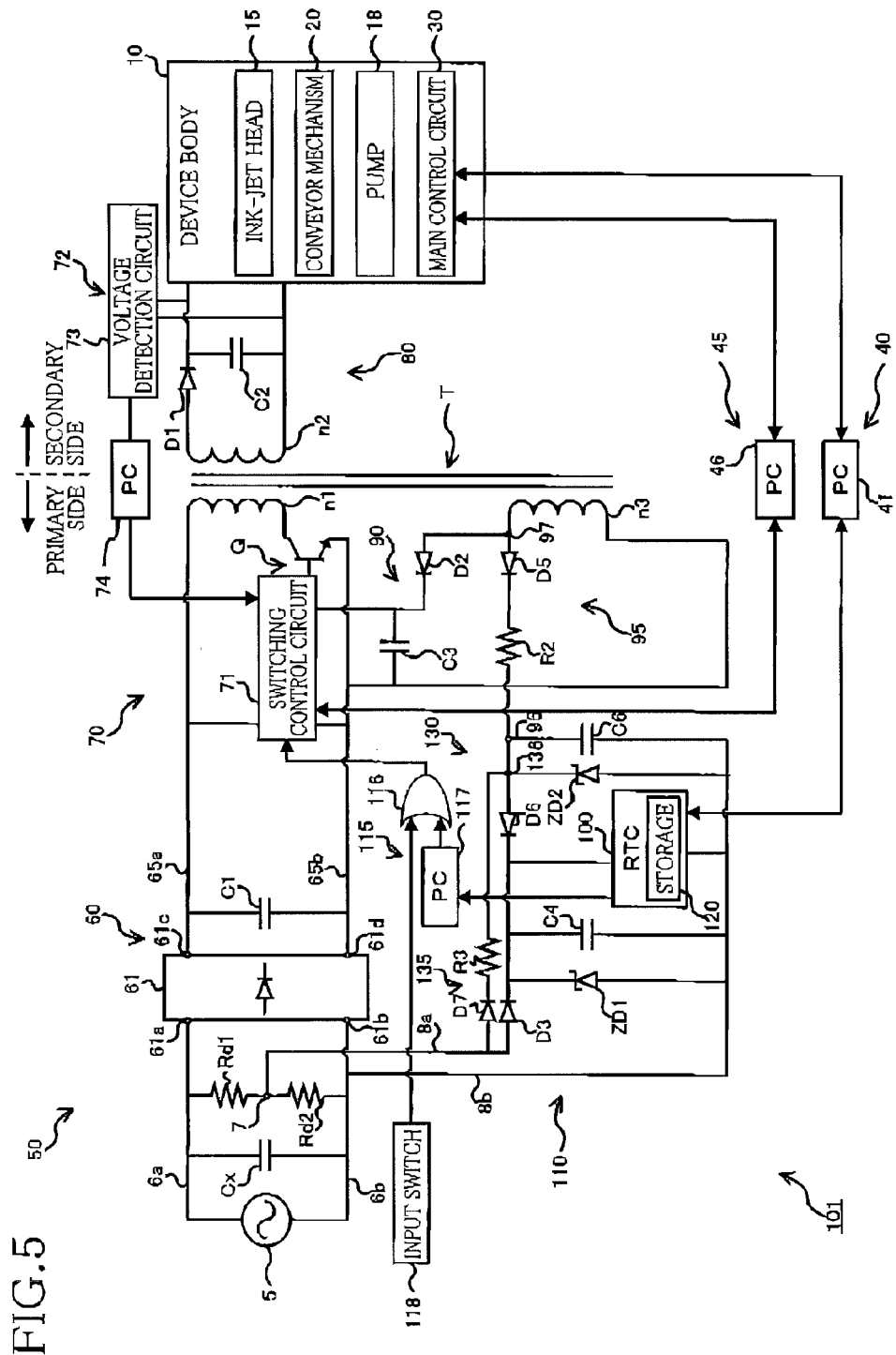
FIG. 5 is a circuit diagram of an ink-jet printer according to a modification of the embodiment.

A circuit (a backup power supply circuit 130) illustrated in FIG. 5 may be employed as the backup power supply circuit designed to supply the electric power to the real-time clock 100 when the power supply from the alternating-current power supply 5 is stopped. This backup power supply circuit 130 receives the electric power directly from the power lines 8a, 8b not via the real-time clock 100 but via a rectifier circuit 135 in which a diode D7 and a resistor R3 are connected to each other in series. The backup power supply circuit 130 includes: a diode D6 connected between an output terminal 136 of the rectifier circuit 135 and one of the input terminals of the real-time clock 100; and a capacitor C6 and a Zener diode ZD2 which are connected in parallel between the power line 8b and the output terminal 136 of the rectifier circuit 135. The Zener diode ZD2 is designed to keep a voltage between opposite ends of the capacitor C6 at a fixed value. An anode of the diode D6 is connected to the output terminal 136, and a cathode thereof is connected to the input terminal of the real-time clock 100. When the electric power is supplied from the alternating-current power supply 5, a part of the alternating current flowing through the power line 8a is rectified by the diode D7 and then supplied to the backup power supply circuit 130 via the resistor R3, so that electric charge is accumulated in the capacitor C6. When the power supply from the alternating-current power supply 5 is stopped, on the other hand, the electric charge accumulated in the capacitor C6 is supplied to the real-time clock 100 via the diode D6.

While the first communicably coupling circuit 40 and the second communicably coupling circuit 45 respectively includes the photocouplers 41, 46 for allowing the communications in the electrically insulated state in the above-described embodiment, any elements may be used for the first communicably coupling circuit 40 and the second communicably coupling circuit 45 as long as the elements can transmit signals in the electrically insulated state. For example, transformers may be used.

While the purging operation is performed by the maintenance controller 152 as the maintenance operation for the head 15 in the above-described embodiment, the maintenance operation performed in the present invention may be a flushing operation in which the actuators of the head 15 are driven to eject the ink from the ejection openings. In this case, the actuators are one example of the maintenance mechanism. Alternatively, both of the purging operation and the flushing operation may be performed as the maintenance operation. In this case, both of the pump 18 and the actuators are one example of the maintenance mechanism.

The present invention is applicable not only to the ink-jet printer but also to various kinds of electronic devices.

What is claimed is:
1. An electronic device comprising:
a device body;
a power supply circuitry configured to supply electric power to the device body; and
a real-time clock configured to measure a current time,
the power supply circuitry comprising:
    a transformer comprising a primary winding and a secondary winding, the transformer being configured to convert electric power input to a primary side of the transformer and configured to output the converted electric power to a secondary side of the transformer;
    a switching element disposed on the primary side of the transformer and configured to perform switching of a current to be supplied to the primary winding; and
    a switching controller disposed on the primary side of the transformer and configured to control a start and a stop of the switching of the switching element based on an input signal input from outside the power supply circuitry, the real-tune clock being disposed on the primary side of the transformer and configured to receive electric power on the primary side of the transformer, the device body comprising:
- a main controller disposed on the secondary side of the transformer and configured to control an operation of the electronic device that receives electric power on the secondary side of the transformer; and
- a first communicably coupling circuit configured to couple the main controller and the real-time clock to each other so as to allow communication therebetween in an electrically insulated state, wherein the device body further comprises a second communicably coupling circuit configured to couple the switching controller and the main controller to each other so as to allow communication therebetween in an electrically insulated state, wherein the main controller is configured to transmit a first step request signal as the input signal to the switching controller via the second communicably coupling circuit, and the first stop request signal is a signal for requesting the stop of the switching of the switching element, and wherein the switching controller is configured to control the switching element to stop the switching upon receipt of the first stop request signal.

2. The electronic device according to claim 1, wherein the device body further comprises a second communicably coupling circuit configured to couple the switching controller and the main controller to each other so as to allow communication therebetween in an electrically insulated state.

3. The electronic device according to claim 1, wherein the main controller is configured to, before the first stop request signal is transmitted to the switching controller via the second communicably coupling circuit, transmit starting time information to the real-time clock via the first communicably coupling circuit, and the starting time information is representative of a starting time at which the switching of the switching element is started.

4. The electronic device according to claim 1,
wherein the electronic device is a liquid ejection apparatus comprising a liquid ejection head in which are formed a plurality of ejection openings through which the liquid ejection head ejects liquid for recording an image on a recording medium, and
wherein the main controller is configured to control an operation of the liquid ejection head.

5. The electronic device according to claim 1, wherein the first communicably coupling circuit is a photocoupler which is connected to a signal line connected to the main controller disposed on the secondary side and which is connected to a communication line connected to the real-time clock disposed on the primary side.

6. A electronic device comprising:
a device body;
a power supply circuitry configured to supply electric power to the device body; and
a real-time clock configured to measure a current time,
the power supply circuitry comprising:
- a transformer comprising a primary winding and a secondary winding, the transformer being configured to convert electric power input to a primary side of the transformer and configured to output the converted electric power to a secondary side of the transformer;
- a switching element disposed on the primary side of the transformer and configured to perform switching of a current to be supplied to the primary winding; and
- a switching controller disposed on the primary side of the transformer and configured to control a start and a stop of the switching element based on an input signal input fro outside the power supply circuitry, the real-time clock being disposed on the primary side of the transformer and configured to receive electric power on the primary side of the transformer, the device body comprising:
- a main controller disposed on the secondary side of the transformer and configured to control an operation of the electronic device that receives power on the secondary side of the transformer; and
- a first communicably coupling circuit configured to couple the main controller and real-time clock to each other so as to allow communication therebetween in an electrically insulated state, wherein the real-time clock is capable of transmitting a second stop request signal as the input signal to the switching controller, and the second stop request signal is a signal for requesting the stop of the switching of the switching element, and wherein the switching controller is configured to control the switching element to stop the switching upon receipt of the second stop request signal.

7. The electronic device according to claim 6, wherein the power supply circuitry further comprises a third communicably coupling circuit configured to couple the switching controller and the real-time clock to each other so as to allow communication therebetween in an electrically insulated state.

8. The electronic device according to claim 7,
wherein the main controller is capable of transmitting stopping time information to the real-time clock via the first communicably coupling circuit, and the stopping time information is representative of a stopping time at which the switching of the switching element is to be stopped,
wherein the real-time clock comprises a stopping time storage configured to store the stopping time information transmitted from the main controller, and
wherein the real-time clock is configured to transmit the second stop request signal to the switching controller when the current time has reached the stopping time represented by the stopping time information transmitted from the main controller.

9. An electronic device comprising:
a device body;
a power supply circuitry configured to supply electric power to the device body; and
a real-time clock configured to measure a current time,
the power supply circuitry comprising:
- a transformer comprising a primary winding and a secondary winding, the transformer being configured to convert electric power input to a primary side of the transformer and configured to output the converted electric power to a secondary side of the transformer;
- a switching element disposed on the primary side of the transformer and configured to perform switching of a current to be supplied to the primary winding; and
- a switching controller disposed on the primary side of the transformer and configured to control a start and a stop of the switching of the switching element based on an input signal input from outside the power supply circuitry, the real-time clock being disposed on the primary side of the transformer and configured to receive electric power on the primary side of the transformer, the device body comprising:
- a main controller disposed on the secondary side of the transformer and configured to control an operation of the electronic device that receives electric power on the secondary side of the transformer; and
- a first communicably coupling circuit configured to couple the main controller and the real-time clock to each other so as to allow communication therebetween in an electrically insulated state, wherein the real-time clock is capable of transmitting a start request signal as the input signal to the switching controller, and the start request signal is a signal for requesting the start of the switching of the switching element, and wherein the switching controller is configured to control the switching element to start the switching upon receipt of the start request signal.

10. The electronic device according to claim 9,
wherein the power supply circuitry further comprises a third communicably coupling circuit configured to couple the switching controller and the real-time clock to each other so as to allow communication therebetween in an electrically insulated state, and
wherein the real-time clock is configured to transmit the start request signal to the switching controller via the third communicably coupling circuit in a state in which the electric power is not being supplied to the main controller.

11. The electronic device according to claim 9,
wherein the main controller is capable of transmitting starting time information to the real-time clock via the first communicably coupling circuit, and the starting time information is representative of a starting time at which the switching of the switching element is started,
wherein the real-time clock comprises a starting time storage configured to store the starting time information transmitted from the main controller, and
wherein the real-time clock is configured to transmit the start request signal to the switching controller when the current time has reached the starting time represented by the starting time information transmitted from the main controller.

12. The electronic device according to claim 11,
wherein the transformer further comprises a tertiary winding,
wherein the power supply circuitry further comprises a second rectifier circuit configured to convert alternating-current power output from the tertiary winding, to direct-current power, and
wherein the second rectifier circuit is coupled to the real-time clock and configured to supply, to the real-time clock, the direct-current power obtained by conversion of the alternating-current power output from the tertiary winding.

13. The electronic device according to claim 11,
wherein the electronic device is a liquid ejection apparatus comprising: a liquid ejection head in which are formed a plurality of ejection openings through which the liquid ejection head ejects liquid for recording an image on a recording medium; and a maintenance mechanism configured to perform maintenance of the liquid ejection head,
wherein the main controller is configured to control the maintenance mechanism to perform the maintenance of the liquid ejection head when a non-ejection period over which the liquid is not ejected from the plurality of ejection openings becomes equal to or longer than a predetermined period, wherein the main controller is configured to transmit, to the real-time clock, via the first communicably coupling circuit, the starting time information representing, as the starting time, a time at which the non-ejection period reaches the predetermined period after the stop of the switching of the switching element, and wherein the main controller is configured to control the maintenance mechanism to perform the maintenance of the liquid ejection head when power supply from the transformer is started by the start of the switching of the switching element.

14. An electronic device comprising:
a device body;
a power supply circuitry configured to supply electric power to the device body; and
a real-time clock configured to measure a current time,
the power supply circuitry comprising:
- a transformer comprising a primary winding and a secondary winding, the transformer being configured to convert electric power input to a primary side of the transformer and configured to output the converted electric power to a secondary side of the transformer;
- a switching element disposed on the primary side of the transformer and configured to perform switching of a current to be supplied to the primary winding; and
- a switching controller disposed on the primary side of the transformer and configured to control a start and a stop of the switching of the switching element based on an input signal input from outside the power supply circuitry, the real-time clock being disposed on the primary side of the transformer and configured to receive electric power on the primary side of the transformer, the device body comprising:
- a main controller disposed on the secondary side of the transformer and configured to control an operation of the electronic device that receives electric power on the secondary side of the transformer; and
- a first communicably coupling circuit configured to couple the main controller and the real-time clock to each other so as to allow communication therebetween in an electrically insulated state, wherein the power supply circuitry further comprises:
- a first rectifier circuit configured to convert alternating-current power supplied from an alternating-current power supply, to direct-current power to supply the direct-current power to the switching controller and the primary winding of the transformer;
- an across-the-line capacitor connected between a plurality of power supply lines of the alternating-current power supply, the across-the-line capacitor being disposed on an input side of the first rectifier circuit and configured to remove high-frequency noise; and
- at least two discharge resistors connected to the across-the-line capacitor in parallel and connected in series between the plurality of power supply lines of the alternating-current power supply, the at least two discharge resistors being configured to discharge electric charge accumulated in the across-the-line capacitor, and wherein the real-time clock is connected between (i) a connection point of one discharge resistor of the at least two discharge resistors and (ii) one of (a) a connection point of another discharge resistor of the at least two discharge resistors and (b) one of the plurality of power supply lines of the alternating-current power supply.

* * * * *